March 3, 1970 W. R. FRINT ET AL 3,498,744
PURIFICATION OF CALCINED CRUDE TRONA BY
MONOHYDRATE RECRYSTALLIZATION
Filed Sept. 18, 1961 3 Sheets-Sheet 1

INVENTORS
WILLIAM R. FRINT
RICHARD W. WAGGENER
BY
ATTORNEY

March 3, 1970  W. R. FRINT ET AL  3,498,744
PURIFICATION OF CALCINED CRUDE TRONA BY
MONOHYDRATE RECRYSTALLIZATION
Filed Sept. 18, 1961  3 Sheets-Sheet 3

INVENTORS
WILLIAM R. FRINT
RICHARD W. WAGGENER
BY
ATTORNEYS

United States Patent Office 3,498,744
Patented Mar. 3, 1970

3,498,744
PURIFICATION OF CALCINED CRUDE TRONA BY MONOHYDRATE RECRYSTALLIZATION
William R. Frint and Richard W. Waggener, Green River, Wyo., assignors, by mesne assignments, to Intermountain Research & Development Corporation, Cheyenne, Wyo., a corporation of Wyoming
Filed Sept. 18, 1961, Ser. No. 138,792
Int. Cl. C01d 7/00, 11/00
U.S. Cl. 23—63   18 Claims The invention relates to a process for the production of a soda ash of consistent quality useful for many industrial purposes from naturally occuring trona as found in Wyoming and other parts of the world.

The trona deposits in southwestern Wyoming are found at a depth of 1200 to 1800 feet underground and consist of a main trona bed and other beds of smaller thickness. The trona consists mainly of sodium sesquicarbonate ($Na_2CO_3 \cdot NaHCO_3 \cdot 2H_2O$) and 4 to 6% insoluble impurities. A typical analysis of a trona bed is:

| | Percent |
|---|---|
| $Na_2CO_3$ | 45 |
| $NaHCO_3$ | 36 |
| $H_2O$ | 15.3 |
| NaCl | 0.04 |
| $Na_2SO_4$ | 0.01 |
| $Fe_2O_3$ | 0.08 |
| Insolubles | 3.6 |

The composition of this material corresponds rather closely to that of pure sodium sesquicarbonate except for the impurities present. The trona is associated with shale beds and stringers which alter the amount of impurities in different parts of the trona bed and a typical mine run will contain about 10% insoluble material.

The sodium sesquicarbonate can be converted into soda ash by heating above the decomposition temperature according to the following reaction:

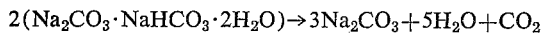

When typical mine run trona is thus calcined without any purification the resulting soda ash is approximately 85% pure $Na_2CO_3$. This soda ash is highly impure when compared to the refined soda ash used commercially which analyzes 99.6 to 100% sodium carbonate and its use is therefore limited.

Many industries such as the glass industry do not require a highly refined soda ash. In the manufacture of clear glass the main raw materials other than soda ash are feldspar, nephelite, sand and lime which to a great extent are the same materials as the impurities associated with the crude trona. However, the calcined crude trona cannot be used in the glass industry because the amount of impurities in the crude trona vary greatly and a consistent quality product cannot be obtained.

Various methods have been used to obtain pure soda ash from crude trona. One such process is described in U.S. Patent No. 2,962,348 wherein crude trona is calcined to crude soda ash, the crude soda ash is dissolved in water, the insoluble impurities removed, water is evaporated from the solution to crystallize sodium carbonate monohydrate, the monohydrate crystals are separated and calcined to produce dense soda ash and the mother liquor is recycled to the evaporators. This process has the disadvantage that large amounts of solution have to be evaporated to recover the soda values.

Crystallization by cooling such as described in the Pike Patent No. 2,346,140 requires complicated equipment such as liquor and slurry pumps, crystallizers, condensers, jet exhaust pumps and a cooling tower. Crystallization by evaporation requires large evaporative type crystallizers and large heat exchangers.

It is an object of this invention to provide a simple process for the production of a soda ash of consistent quality from crude trona.

It is another object of this invention to provide a simplified process for the purification of crude soda ash without evaporation of large amounts of water.

It is a further object of the invention to provide a process for the production of soda ash of consistent quality from crude trona with a minimum of equipment.

It is an additional object of the invention to provide a process for growing crystals of sodium carbonate monohydrate larger than the trona insolubles whereby the said crystals may be separated from the said insolubles.

These and other objects and advantages of the invention will become obvious from the following detailed description.

Referring now to the drawings.

The process of the invention comprises calcining the crude trona to anhydrous crude soda ash, crushing the anhydrous crude soda ash, adding the crushed soda ash to a saturated aqueous solution of sodium carbonate in a recrystallizer whereby the anhydrous soda ash is dissolved and hydrated sodium carbonate is simultaneously crystallized, classifying the hydrated sodium carbonate crystals whereby most of the insoluble impurities are removed with the mother liquor, recycling the mother liquor to the recrystallizer and calcining the said hydrated crystals to form soda ash.

Figure 1:
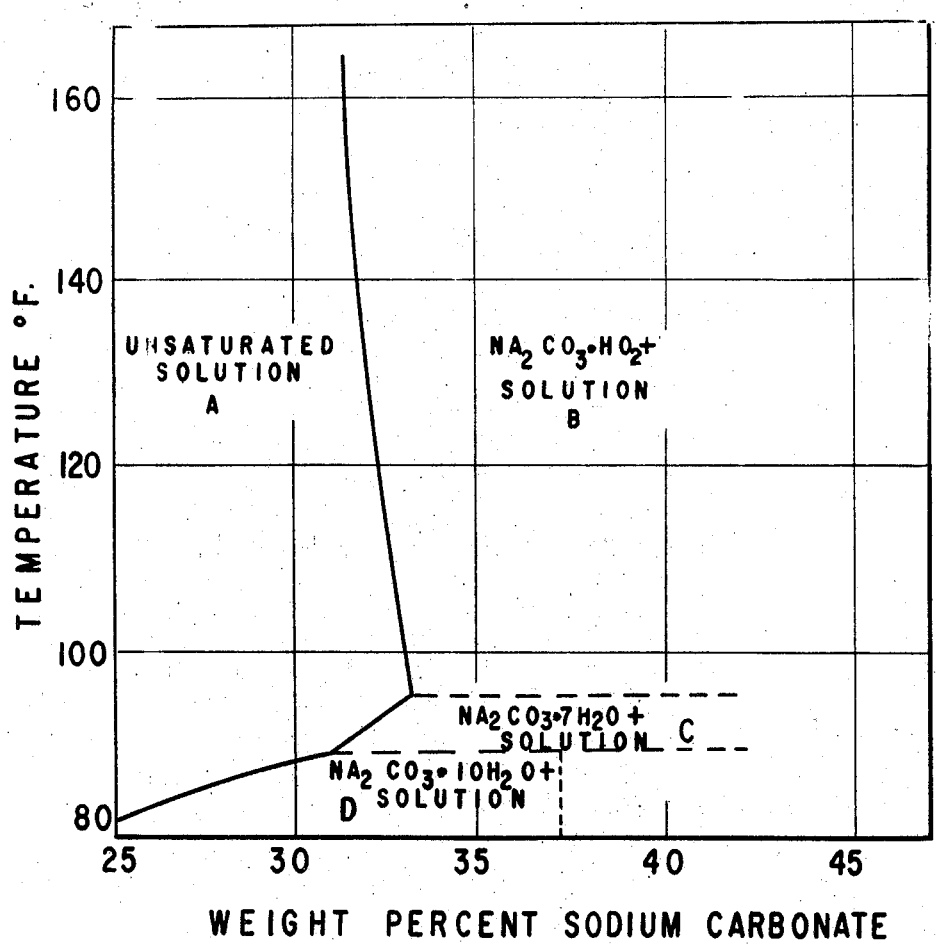
FIGURE 1 is a solubility diagram for sodium carbonate.

FIGURE 1 is a solubility diagram for sodium carbonate showing the various hydrates of sodium carbonate which may be crystallized from an aqueous solution of sodium carbonate at various concentrations and temperatures of the solution. Area A shows the region of the unsaturated solution wherein no crystals will form. Area B shows the region where sodium carbonate monohydrate will crystallize from solution. Areas C and D show the regions where sodium carbonate heptahydrate and sodium carbonate decahydrate, respectively, will crystallize from solution.

If the temperature of the solution is above 95° F., the hydrate formed will be sodium carbonate monohydrate ($Na_2CO_3 \cdot H_2O$). If the temperature of the solution is below 95° F., other hydrates will be crystallized. For example, sodium carbonate heptahydrate ($Na_2CO_3 \cdot 7H_2O$) will be produced if the solution is between 90° and 95° F. and the concentration of the solution is between 31% and 45.5% soda ash. The preferred crystallization is carried out above 95° F. so sodium carbonate monohydrate crystals are formed.

Figure 2:
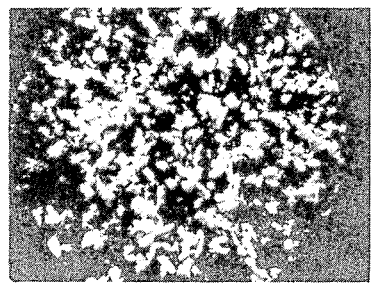
FIGURES 2 and 2a are photomicrographs of the recrystallizer feed ash and monohydrate crystal from the recrystallizer.
Figure 2A:
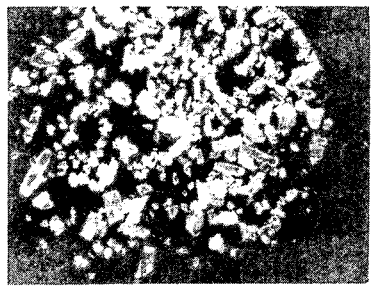

The step of adding anhydrous soda ash to a saturated solution of sodium carbonate and simultaneously crystallizing hydrated sodium carbonate from the said solution is called herein recrystallization. The saturated solution of sodium carbonate at temperatures between 95° F. and 230° F. is in equilibrium with sodium carbonate monohydrate only and not in equilibrium with anhydrous sodium carbonate. The anhydrous sodium carbonate dissolves in the solution causing the solution to be supersaturated and sodium carbonate monohydrate crystallizes from the solution. The process is not a simple hydration of the sodium carbonate as the size and shape and the chemical structure of the hydrated crystals are entirely different from the anhydrous crystals added to the solution indicating that a recrystallization has taken place. FIGURES 2 and 2a show the difference in size and shape of the anhydrous sodium carbonate feed crystals and the sodium carbonate monohydrate crystals recovered from the recrystallizer. The monohydrate crystals are larger and more clearly defined than the feed crystals.

While it is possible to attain a refined soda ash of 99.6 to 100% purity by the process of the invention, it is more economical to attain a soda ash having a purity of about 99% which is adequate for most industrial uses. Most of the soluble and insoluble impurities are excluded from the sodium carbonate monohydrate crystals during their growth and therefore the said monohydrate crystals are much more pure than the starting materials. Since some of the insoluble impurities will be included with the monohydrate crystals, it is difficult to get a C.P. grade soda ash product, but the soda ash will be of a consistent high quality suitable for industrial use.

When grown under proper conditions, the sodium carbonate monohydrate crystals are larger than the insoluble impurity particles and the monohydrate crystals can be easily separated from the insoluble material by any suitable classifier. The classification can be made by any industrial device such as a rake classifier, screw classifier, elutriation column, screen jigs, etc. A screen jig is preferred.

The degree of recrystallization to sodium carbonate monohydrate depends upon the size of the anhydrous soda ash crystals. Ash coarser than 35-mesh is difficult to recrystallize at any additional temperature. Anhydrous soda ash of 35-mesh recrystallizes completely at an ash feed temperature of 392° F. and higher and −60 mesh anhydrous soda ash at 212° F. will completely recrystallize. Generally, the finer the feed ash, the lower the ash addition temperature required for complete recrystallization. A preferred process is the addition of −100 mesh ash at a temperature of 392° F. The saturated solution is between 95° F. and its boiling point.

The anhydrous soda ash may be added to the recrystallizer at a widely varying rate. In our experimental work the preferred rate of addition has been found to be about 0.4 pound of anhydrous soda ash per minute per gallon of recrystallizing solution, but in other operations the rate of addition will vary with the crystallization conditions such as type of agitation. The recrystallizing solution should be thoroughly agitated to obtain the best results and the crystal slurry in the recrystallizer should be drawn off at a rate sufficient to maintain in the recrystallizer a slurry concentration of 10 to 40% crystals.

The use of the classifier is essential to obtain a semi-purified soda ash of consistent quality. For example, if the classifying step is omitted and the slurry is pumped directly to a centrifugal filter for dewatering, the calcined product will analyze 99.0% sodium carbonate if the feed to the recrystallizer is 97.1% sodium carbonate. If the feed is 86.6% sodium carbonate, the calcined product will analyze 93.3 to 94.8% sodium carbonate. By employing a classifier such as a screening jig before the centrifugal filter step, the calcined products from the 86.6% and 97.1% sodium carbonate starting material will analyze 99.2% and 99.4% sodium carbonate, respectively. The purity of the product will ordinarily vary from 98.9 to 99.5% or a variation of 0.6%. Most of the insolubles are removed during the classifying of the slurry because the insoluble particles are finer than the hydrated crystals of sodium carbonate. If the crystals are passed directly to a centrifuge without classification some of the finer insoluble material will be trapped in the centrifuge cake and contaminate the product.

The semi-purified soda ash may be further up graded by screening the product as it comes from the calciner at 100-mesh. The +100 mesh product will then analyze 99.0 to 99.5% sodium carbonate and the −100 mesh product can be recycled to the recrystallizer. As can be seen from the following table the screening considerably reduces the iron and organics in the product. The crude trona ore analyzed was calcined, recrystallized, wet screened, centerifuged and calcined.

TABLE I

| Constituent | Recrystallizer feed | Unscreened product | +100 mesh screened product |
|---|---|---|---|
| COD, p.p.m. | 3,180 | 260 | 230 |
| Percent of $Fe_2O_3$ | 0.33 | 0.03 | 0.02 |
| Percent of NaCl | 0.07 | 0.01 | |
| Percent of $Na_2SO_4$ | 0.03 | 0.00 | 0.00 |

A purge is often desirable in the system to prevent the buildup of soluble impurities in the recrystallizer and subsequent inclusion of said impurities in the final product. For example crude trona contains varying amounts of sodium chloride and sodium sulfate and while the presence of these two compounds is beneficial because they depress the solubility of the hydrated crystals, a buildup of either or both can result in the formation of complex salts which may crystallize out with the hydrated product. Therefore, to maintain the concentration of the soluble impurities below the point of crystallization a purge of the recycling mother liquor is used.

Figure 3:
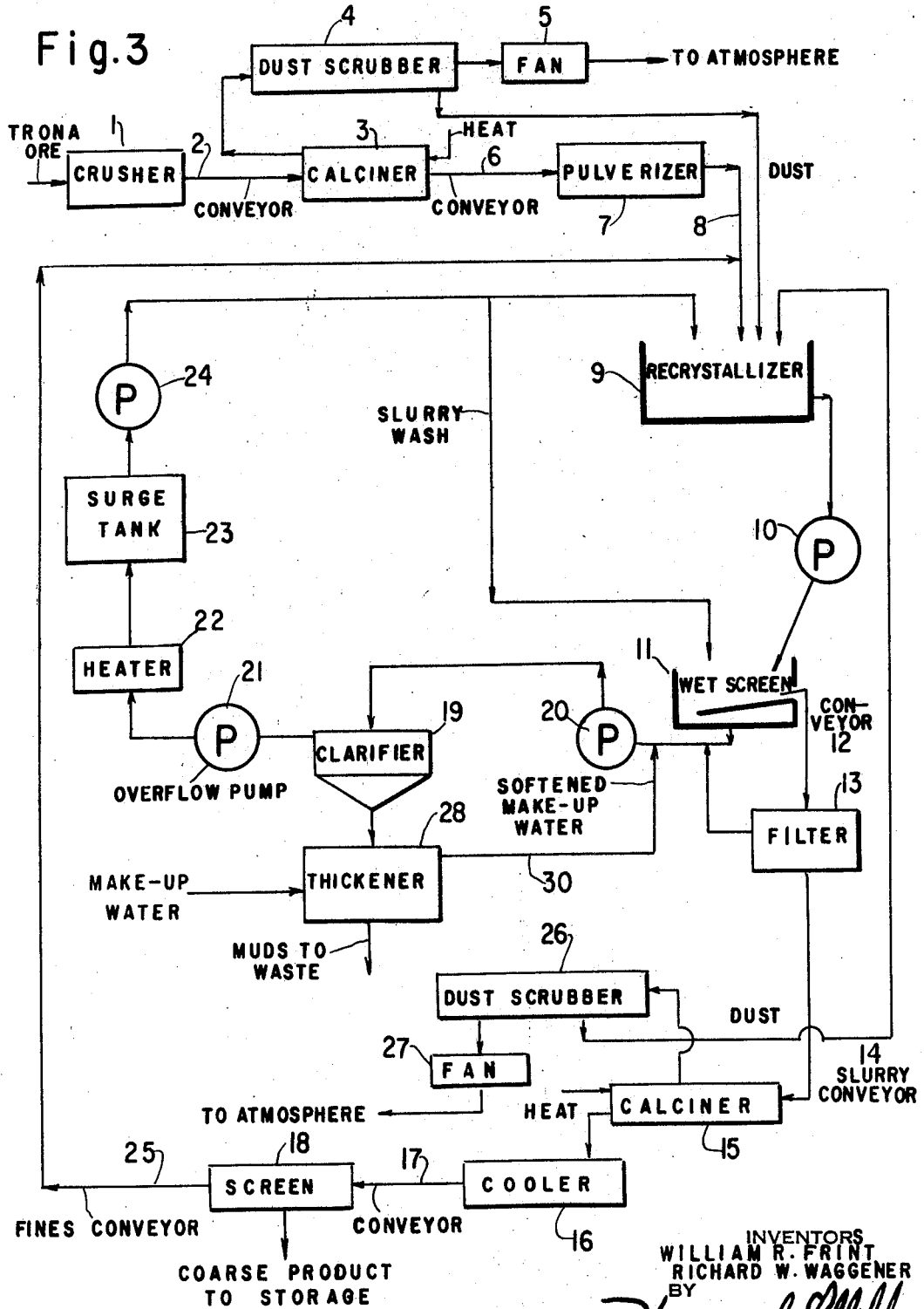
FIGURE 3 is a flow diagram of one embodiment of the process of the invention.

In FIGURE 3 a flow diagram is shown of a continuous recrystallization system. The crude trona ore is crushed in the crusher 1 to a size smaller than of ½ to 1 inch and then is conveyed by conveyors 2 to calciner 3 which is operated at 752° to 1472° F. The combustion products, water and carbon dioxide, are drawn from the calciner by fan 5. A dust scrubber 4 is interposed between the calciner 3 and the fan 5 and the dust collected can be dissolved in recrystallizer 9 to recover the sodium carbonate values therein. The hot calcined soda ash is removed from the calciner 3 by converter 6 to the pulverizer 7 where it is reduced to 100-mesh size. The hot soda ash is then added to the solution of sodium carbonate in the recrystallizer 9 at 176° F. by conveyor 8 whereby a slurry of sodium carbonate monohydrate is formed. The resulting slurry is pumped by pump 10 to the wet screen jig 11 wherein the monohydrate crystals, which constitute the product portion, are separated from the saturated solution of sodium carbonate and the insoluble material suspended therein. The monohydrate is washed on the wet screen jig 11 with a clear saturated solution of sodium carbonate and is then transferred by conveyor 12 to a centrifugal filter 13 wherein the residual mother liquid is removed. The dewatered slurry is removed by conveyor 14 to calciner 15 wherein the sodium carbonate monohydrate is converted to sodium carbonate by heating at 392° F. The combustion products are removed by fan 27. A dust scrubber 26 is located between the calciner 15 and the fan 27 and the collected dust is returned to the recrystallizer 9. The calcined product is cooled in a cooler 16 and then removed by conveyor 17 to a 100-mesh screen 18. The +100 mesh product is recovered and the −100 mesh product is returned to conveyor 8 by conveyor 25 to be added to the recrystallizer 9. The mother liquor from the wet screen 11 and the centrifugal filter 13, constituting the return portion, is sent to a settling clarifier 19 by pump 20 wherein the insolubles are settled out and purged from the system.

Raw river water having an average hardness of about 270 p.p.m. calculated as calcium carbonate is introduced into the system through the clarifier muds discharged from clarifier 19 and in contact with the trona insolubles and associated mother liquor from the clarifier 19, in thickener 28, is softened to a hardness of about 50 to 60 p.p.m., calculated as calcium carbonate. The calcium is automatically precipitated and discarded with the insoluble muds to waste and at the same time the residual sodium values in the trona insolubles are recovered. The softened make up water flows through the line 30 to the inlet to pump 20. By using softened water for the process in this manner, scaling of the equipment is greatly reduced. The softened water is added at pump 20 to the mother liquor to dissolve any small monohydrate crystals in the mother liquor. The clear overflow from the clarifier 19 is passed through pump 21 to the heater 22 to raise the mother liquor temperature to 176° F. The heated mother liquor is placed in the surge tank 23 and pumped to the recrystallizer 9 and the wet screen jig 11 by pump 24.

In the following table the flow of material required to produce 100,000 tons of semi-purified soda ash of consistent quality per plant year based on the flow diagram of FIG. 3 is shown. The starting feed is 86.6% sodium carbonate and the final product is 99.1% sodium carbonate.

TABLE II

CONSTITUENT IN POUNDS PER MINUTE

| | Sodium carbonate | Sodium carbonate monohydrate | Insolubles | Solution of sodium carbonate |
|---|---|---|---|---|
| Crude soda ash feed | 430.6 | | 67.2 | |
| Slurry from recrystallizer | | 571.5 | 68.4 | 938.9 (31%) |
| Slurry from wet screen | | 508.0 | 9.7 | 345.2 (31%) |
| Wet cake from centrifugal filter | | 508.0 | 5.0 | 15.2 (31%) |
| Calcined soda ash | 438.8 | | 5.0 | |
| +100 mesh soda ash | 412.9 | | 3.8 | |
| −100 mesh soda ash | 25.9 | | 1.2 | |
| Mother liquor from wet screen | | 60.2 | 58.7 | 937.7 (31%) |
| Mother liquor centrifugal filter | | | 4.7 | 330.0 (31%) |
| Make-up water | | | | 132.2 (0%) |
| Purge from clarifier | | | 63.4 | 65.5 (30.4%) |
| Solution in surge tank | | | | 1,394.6 (30.4%) |
| Mother liquor to recrystallizer | | | | 1,053.9 (30.4%) |
| Wash water for wet screen | | | | 340.7 (30.4%) |

Various modifications of the process of the invention may be made without departing from the spirit or scope thereof, and it is to be understood that the invention be limited only as defined in the appended claims.

We claim:

1. A process for the preparation of soda ash of consistent high quality from crude trona which comprises calcining the crude trona to anhydrous crude soda ash, crushing the anhydrous crude soda ash, adding the crushed crude soda ash to a saturated aqueous solution of sodium carbonate whereby the anhydrous soda ash is dissolved and hydrated sodium carbonate is simultaneously crystallized, classifying the hydrated sodium carbonate crystals whereby most of the insoluble impurities are removed with the mother liquor, recycling the mother liquor to the crystallization zone and calcining the said hydrated sodium carbonate crystals to form soda ash of consistent high quality.

2. The process of claim 1 wherein the saturated aqueous solution is at a temperature between 95° F. and its boiling point and the hydrated sodium carbonate crystallized is sodium carbonate monohydrate.

3. The process of claim 1 wherein the hydrated sodium carbonate is sodium carbonate heptahydrate.

4. The process of claim 1 wherein the hydrated sodium carbonate is sodium carbonate decahydrate.

5. A process for the production of soda ash of consistent high quality from crude trona which comprises calcining crude trona to form anhydrous crude soda ash, crushing said soda ash to a particle size less than −35 mesh, adding the crushed anhydrous soda ash to a saturated aqueous solution of sodium carbonate whereby the said soda ash is dissolved and hydrated sodium carbonate is simultaneously crystallized, separating the hydrated sodium carbonate crystals from the mother liquor and insolubles, adding sufficient make-up water to the mother liquor to obtain the original volume, removing the insolubles from the mother liquor, recycling the mother liquor to the crystallization step, calcining the hydrated sodium carbonate crystals to form soda ash of consistent high quality and recovering said soda ash.

6. The process of claim 5 wherein the make-up water is soft water obtained by washing the insolubles with hard natural water wherein the calcium carbonate content of the water is reduced and residual carbonate values are recovered from the insolubles.

7. The process of claim 5 wherein the anhydrous crude soda ash is crushed to a particle size of −100 mesh.

8. The process of claim 5 wherein the soda ash is screened whereby fines are separated from the soda ash, recycling the fines to the recrystallization step and recovering a soda ash having a purity greater than 95%.

9. A process for the preparation of soda ash of consistent high quality from crude trona which comprises calcining the crude trona to anhydrous crude soda ash, crushing the anhydrous crude soda ash, adding the crushed crude soda ash to a saturated aqueous solution of sodium carbonate whereby the anhydrous soda ash is dissolved and hydrated sodium carbonate is simultaneously crystallized, classifying the hydrated sodium carbonate crystals whereby most of the insoluble impurities are removed with the mother liquor and calcining the said hydrated sodium carbonate crystals to form soda ash of consistent high quality.

10. A process for the preparation of purified hydrated sodium carbonate from crude trona which comprises calcining the crude trona to anhydrous crude soda ash, crushing the anhydrous crude soda ash, adding the crushed crude soda ash to a saturated aqueous solution of sodium carbonate to dissolve the anhydrous soda ash and simultaneously precipitate hydrated sodium carbonate crystals and recovering the said hydrated sodium carbonate crystals.

11. A process for the preparation of purified sodium carbonate from crude Wyoming trona containing insoluble impurities which comprises crushing the crude trona, calcining the crude trona to crude sodium carbonate, adding the crude sodium carbonate to a saturated aqueous crystallizer solution of sodium carbonate to form a slurry of sodium carbonate monohydrate crystals and insoluble impurities in a saturated aqueous solution of sodium carbonate; dividing said slurry into a sodium carbonate monohydrate product portion and a return portion, recovering sodium carbonate monohydrate crystals from the product portion and calcining into purified sodium carbonate and returning the return portion to the crystallizer solution.

12. A process for the preparation of purified sodium carbonate from crude Wyoming trona containing insolubles, which comprises calcining the crude trona to crude sodium carbonate containing insolubles, adding the hot crude sodium carbonate from the calcining to a saturated aqueous crystallizer solution of sodium carbonate maintained at a temperature above 80° C. and below 110° C., to form sodium carbonate monohydrate crystals and insolubles suspended in a saturated aqueous solution of sodium carbonate, separating said suspension into a sodium carbonate monohydrate product portion and a liquor return portion, recovering sodium carbonate monohydrate crystals from said product portion and calcining to produce purified sodium carbonate and returning the liquor return portion to the saturated aqueous crystallizer solution.

13. The process of treating particulate crude trona containing sodium sesquicarbonate and insoluble impurities to separate on the basis of differing particle size solid particles of hydrated sodium carbonate from the insoluble impurities, which comprises calcining said crude trona to form anhydrous sodium carbonate, converting said anhydrous sodium carbonate into hydrated sodium carbonate crystals of size greater than the particle size of said insoluble impurities by introducing the calcined trona into a saturated aqueous solution of sodium carbonate, and separating said hydrated sodium carbonate in crystalline form from said saturated solution and from said insoluble impurities on the basis of their differing particle size.

14. The process of claim 13 wherein said hydrated sodium carbonate crystals comprise the monohydrate form.

15. The process of claim 13 in which said trona at the time of introduction into said saturated aqueous solution is of a particle size of less than minus 35 mesh.

16. The process of claim 13 in which said trona at the time of introduction into said saturated aqueous solution is of a particle size of less than minus 100 mesh.

17. The process of claim 13 in which said trona at the time of introduction into said saturated aqueous solution has a particle size of minus 100 mesh and in which said saturated aqueous solution for formation of said hydrated sodium carbonate crystals in the monohydrate form is at a temperature between 95° F. and its boiling point, separating the insoluble impurities from the mother liquor, and recycling the mother liquor to form a part of said saturated aqueous solution.

18. The process of claim 13 in which crude Wyoming trona is dry-mined and calcined and crushed to reduce the particle size of said insoluble impurities in said solution to less than the particle size of the hydrated sodium carbonate crystals formed therein.

References Cited

UNITED STATES PATENTS

| | | | |
|---|---|---|---|
| 1,650,244 | 11/1927 | Sundstrom et al. | 23—63 |
| 1,907,987 | 5/1933 | Lynn | 23—63 |
| 2,792,282 | 5/1957 | Pike | 23—38 |
| 2,962,348 | 11/1960 | Seglin et al. | 23—63 |

OSCAR R. VERTIZ, Primary Examiner

G. T. OZAKI, Assistant Examiner

U.S. Cl. X.R.

23—38, 302